000
UNITED STATES PATENT OFFICE.

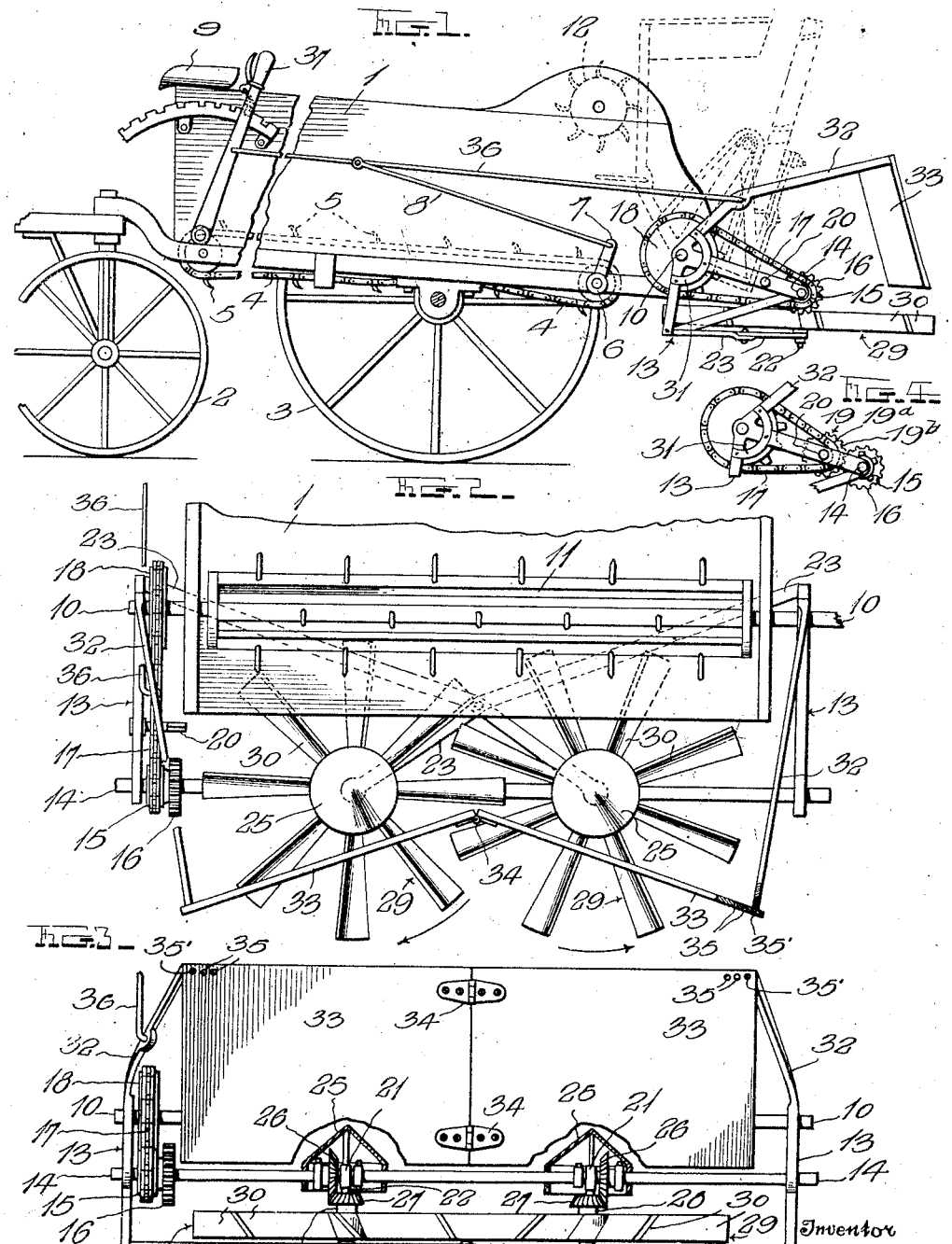
G. D. NEAVITT.
DISTRIBUTER ATTACHMENT FOR MANURE SPREADERS.
APPLICATION FILED MAY 7, 1915.
1,203,388.
Patented Oct. 31, 1916.

GEORGE D. NEAVITT, OF CENTERVILLE, MARYLAND.

DISTRIBUTER ATTACHMENT FOR MANURE-SPREADERS.

1,203,388.  Specification of Letters Patent.  Patented Oct. 31, 1916.

Application filed May 7, 1915. Serial No. 26,552.

*To all whom it may concern:*

Be it known that I, GEORGE D. NEAVITT, a citizen of the United States, residing at Centerville, in the county of Queen Anne and State of Maryland, have invented certain Improvements in Distributer Attachments for Manure-Spreaders.

My invention relates to improvements in manure spreaders and has for its main object to provide novel means for distributing the fertilizer in a simple and efficient manner at any one of a number of widths, and in such a way as to prevent winds from varying the width and regularity of spread.

With this general object in view, the invention resides in certain novel features of construction and in unique combinations of parts to be hereinafter more fully described and claimed, the descriptive matter being supplemented by the accompanying drawing wherein, Figure 1 is a side elevation of a spreader constructed in accordance with my invention; Fig. 2 is a top plan view of the rear end thereof; Fig. 3 is a rear elevation with parts broken away and in section; and Fig. 4 is a detail side elevation showing the manner in which the distributer may be reversed.

In these drawings, similar reference characters designate corresponding parts throughout the several views, the numeral 1 indicating broadly the body of a manure spreader which is supported by the usual front and rear wheels 2 and 3 respectively, and is equipped in its bottom with any preferred type of rearwardly moving feed member 4 which is preferably in the form of a common type of apron having transverse slats provided with arcuate prongs 5 to reliably engage the contents of the body 1 to move such contents rearwardly.

As is common with spreaders of the class described, some means is provided for varying the speed of the feed member 4, and in view of the fact that any one of the mechanisms now in use might well be used for this purpose, I have only represented such a mechanism at 6 in Fig. 1, and have shown the same as provided with an operating lever 7 from which a rod or link 8 extends forwardly. The rod 8, or a similar rod, is employed on most types of spreaders for controlling the apron feeding mechanism, and is usually connected to a lever adjacent the driver's seat 9, but in accordance with my invention, the rod in question is connected in a different manner yet to be specified.

Rotatably mounted upon a transverse horizontal shaft 10 in rear of the feed member 4, is a common type of rotary beater 11 which, in addition to a supplemental beater 12 spaced upwardly from said beater 11, may be driven by any preferred means from the rear wheels 3. The opposite ends of the shaft 10 project beyond the upright sides of the body 1 and receive loosely thereon bearings carried preferably at one corner of a pair of end frames 13 which are usually triangular.

The frames 13 rotatably support a horizontal transverse shaft 14 provided near one end with a sprocket wheel 15 and with a gear 16, the shaft being normally driven by a sprocket chain 17 which passes around the driving sprocket 18 keyed to the shaft 10 and around the sprocket 15. For reasons yet to become obvious, however, it is desirable at times to reverse the direction in which the shaft 14 is rotated. For accomplishing the last named end, a combined gear and sprocket wheel 19 may be rotatably mounted on a stub shaft or the like 20 carried by one end frame 13 (see Fig. 4). If this be done, the chain 17 will be shortened and will be passed around the sprocket wheel 19$^a$ of the device 19 while the gear 19$^b$ of such device will mesh with the gear 16. By so doing, it is obvious that the direction in which the shaft 14 is driven will be reversed.

Loosely surrounding the shaft 14 at suitably spaced points, is a pair of bearings 21 from which stub shafts 22 project at right angles to the shaft 14, said stub shafts being held in rigid relation by any preferred means such as the crossed braces 23 which lead therefrom to the end frames 13. Supported in any preferred manner by the bearings 21, is a pair of conical shields 25 which house therein a pair of bevel gears 26 keyed to the shaft 14, and beveled pinions 27 which mesh with the gears 26 and are rotatably mounted on the shafts 22. The pinions 27 are secured to the hubs 28 of a pair of manure distributers 29 in the form of paddle wheels, each having a plurality of radiating paddles 30 disposed in the same plane and having their opposite flat sides set at acute angles to the plane in which they travel. As shown, the paddles of one wheel 29 are pitched oppositely to those of the other, this construction being preferable in order to obtain the desired results in the most efficient manner.

Projecting at an angle from the frames 13 and preferably braced thereto as indicated at 31 in Fig. 1, is a pair of arms 32 carrying a transversely elongated shield plate 33 which is disposed adjacent the rear edge of the paddle wheel distributers 29 and which is formed of two sections hinged together at 34 centrally between the ends of said plate. Any suitable connection between the plate 33 and the arms 32 may be provided, and in view of this I have merely indicated one manner of accomplishing the necessary result, by forming openings 35 in the opposite ends of the plate in question and by passing screws 35' through said openings into the arms.

Pivoted to one of the arms 32 between the ends thereof and leading forwardly from said arm is a rod 36 whose front end is pivoted to a lever 37 (preferably though not necessarily a hand lever). The lever 37 is located in close proximity to the driver's seat 9 and is equipped with a suitable locking mechanism 28 whereby it may be held against movement in its various adjusted positions. By moving the lever 37 forwardly, the frame structure supporting the distributions 29, will be moved upwardly and forwardly to the position disclosed in dotted lines in Fig. 1, or to any one of a number of intermediate positions, thus varying the angular relation of the axes of the distributers in respect to the feed member 5 and the direction of travel of the machine. This is important, since by so doing the operator may control the width of spread from the seat 9, it being obvious that when the distributers 29 are positioned horizontally as shown in Figs. 1 and 2 and are rotated in the direction of the arrow in Fig. 2, side or rear winds will not affect the evenness of spread and the fertilizer will be thrown downwardly, but outwardly only to a slight extent, whereas if the distributers are raised to other positions, the material will be spread over a wider strip of land, due to the fact that it is thrown outwardly to a greater extent.

When the direction of travel of the distributers 29 is reversed by the application of the member 19, they will throw the fertilizer inward and downward, provided said distributers are interchanged or substituted one for the other. This causes the manure to be thrown downwardly and inwardly to spread a narrow strip of land. When, however, the distributers are positioned as shown in Fig. 2 and their direction of travel is reversed, the fertilizing material will be thrown inwardly and upwardly, thus causing the same to be deposited lightly upon the earth. When the distributers are interchanged in Fig. 2 and their direction of travel is as shown by arrows in Fig. 2, then a very wide distribution of fertilizer is accomplished, the fertilizer being thrown upwardly and outwardly. This is advantageous when fertilizing tender growing crops. It also allows fast work in broadcasting fertilizers.

During all of the spreading operations, the shield plate 33 plays the important part of properly guiding the manure to the distributers in order that the spread will be of uniform thickness throughout.

Obviously, if the speed of the apron 5 were not increased proportionately with the increasing width of spread, the manure would be deposited in a thinner layer upon the ground, whereas when spreading a narrow strip, the fertilizer would be spread entirely too thickly. It therefore is highly advantageous to provide some simple means whereby the speed of the apron 4 may be increased when the width of spread is increased and vice versa. This end I have accomplished by connecting the usual rod 8 which operates the apron speeding means, with the rod 36, whereby actuation of the lever 37 to vary the width of spread will simultaneously increase or decrease the speed of the apron, as the case may be, thereby allowing a layer of fertilizer of the same thickness to be spread over wide and narrow strips of land.

From the foregoing description, taken in connection with the accompanying drawing, the construction and operation of the invention will be readily understood without requiring a more extended explanation.

In the drawing, certain specific details of construction have been shown for illustrative purposes, but obviously I need not be restricted thereto otherwise than to the extent to which the appended claims limit me.

I claim:

1. A manure spreader having at its rear end a pair of manure distributing paddle wheels rotatable in the same plane, means for shifting said paddle wheels arcuately in the direction of travel of the machine, and a transversely elongated shield plate disposed adjacent one edge of said wheels and shiftable arcuately therewith.

2. A manure spreader having at its rear end a pair of manure distributing paddle wheels rotatable in the same plane, means for shifting said paddle wheels arcuately in the direction of travel of the machine, and a transversely elongated shield plate disposed adjacent one edge of the wheels, shiftable arcuately therewith, and formed of two sections hinged together centrally between the ends of the plate on a line at an angle to the aforesaid plane.

3. A manure spreader having at its rear end a longitudinally swinging frame, a distributer mounted on said frame, means under the control of the operator for swinging said frame at will, including an operating member adjacent the driver's seat, and a transversely elongated shield plate in rear of the distributer, and carried by the frame.

4. A manure spreader having at its rear end a longitudinally swinging pivotally mounted frame carrying a distributing wheel and including a pair of arms, a shield adjacent the edge of the wheel and secured to said arms, said shield standing at an angle to the plane of movement of said wheel, a link extending forwardly from the frame, and means adjacent the driver's seat for shifting said link to swing the frame at will.

5. A manure spreader having at its rear end a beater and having a vertically adjustable rotary distributer in rear of said beater for varying the width of spread when so adjusted, and manually actuated means for adjusting said distributer at will including an operating member adjacent the driver's seat.

6. A manure spreader having a beater and having in rear thereof a rotary paddle wheel for delivering the manure to the earth at any one of a number of angles thereto, and manually operated means for controlling the angles of delivery.

7. The combination with the body of a manure spreader, of a pair of upright end frames pivoted upon a transverse axis to the opposite sides of the body at the rear end thereof, a transverse driven shaft having its opposite ends rotatably mounted on said frames, a pair of bevel gears secured to said shaft, a pair of rotatable distributers having beveled gears intermeshing with the aforesaid gears, and means for swinging the end frames bodily around their axes.

8. A manure spreader having at its rear end a distributer, means for arcuately shifting the same for spreading at various widths, and means for feeding more or less manure to said distributer when it is moved for wide or narrow spreading, whereby the density of the spread material will remain the same regardless of the width of spread.

In testimony whereof I affix my signature.

GEORGE D. NEAVITT.